United States Patent
Casper et al.

(10) Patent No.: US 6,505,248 B1
(45) Date of Patent: Jan. 7, 2003

(54) METHOD AND SYSTEM FOR MONITORING AND DYNAMICALLY REPORTING A STATUS OF A REMOTE SERVER

(75) Inventors: Bradley J. Casper, Brandon, FL (US); Jeffrey H. Dunn, New Port Richey, FL (US); Susan B. Hirsch, Tampa, FL (US); Bryon D. Markee, Holiday, FL (US); David C. Simone, Valrico, FL (US)

(73) Assignee: GTE Data Services Incorporated, Irving, TX (US)

( * ) Notice: Subject to any disclaimer, the term of this patent is extended or adjusted under 35 U.S.C. 154(b) by 0 days.

(21) Appl. No.: 09/275,636

(22) Filed: Mar. 24, 1999

(51) Int. Cl.⁷ .............................................. G06F 13/00
(52) U.S. Cl. ...................................... 709/224; 709/217
(58) Field of Search ............................. 345/349; 707/10; 709/224, 331, 217

(56) References Cited

U.S. PATENT DOCUMENTS

| | | | | |
|---|---|---|---|---|
| 5,999,179 A | * | 12/1999 | Kekic et al. ................. 345/349 |
| 6,070,190 A | * | 5/2000 | Reps et al. .................. 709/224 |
| 6,141,699 A | * | 10/2000 | Luzzi et al. .................. 709/331 |
| 6,148,335 A | * | 11/2000 | Haggard et al. ............. 709/224 |
| 6,151,023 A | * | 11/2000 | Chari ........................... 345/349 |
| 6,175,832 B1 | * | 1/2001 | Luzzi et al. ................... 707/10 |
| 6,178,449 B1 | * | 1/2001 | Forman et al. ............... 709/224 |
| 6,271,845 B1 | * | 8/2001 | Richardson ................. 345/356 |
| 6,317,786 B1 | * | 11/2001 | Yamane et al. .............. 709/224 |
| 6,339,750 B1 | * | 1/2002 | Hoyer et al. ................. 702/182 |
| 6,363,421 B2 | * | 3/2002 | Barker et al. ................ 709/223 |
| 6,405,252 B1 | * | 8/2002 | Gupta et al. ................. 709/224 |
| 6,438,592 B1 | * | 8/2002 | Killian ........................ 709/224 |

OTHER PUBLICATIONS

International Business Machines, Inc.; Copy of "sa2" Commands from Man Pages of AIX Version 4; System Management Guide: Operating System and Devices.

International Business Machines, Inc.; Copy of "sar" Commands from Man Pages of AIX Version 4; System Management Guide: Operating System and Devices.

* cited by examiner

*Primary Examiner*—N. Le
*Assistant Examiner*—Walter Benson
(74) *Attorney, Agent, or Firm*—Leonard Charles Suchyta; James K. Weixel (57) ABSTRACT

Methods and systems consistent with the present invention periodically collect system activity information associated with a remote server and store the information into a parameter file. The parameter file is downloaded from the remote server to a managing server where information in the parameter file is used to update a database entry. In this manner, system activity information on each remote server is collected and available from a central resource, such as the managing server. When the managing server receives a performance request from a user node, information related to selections in the request are extracted from one or more database entries. This information is used and analyzed to dynamically create an output, which provides the status of the remote server. Typically, the output (preferably a graphical output file) is then transmitted to the user node.

26 Claims, 11 Drawing Sheets

METHOD AND SYSTEM FOR MONITORING AND DYNAMICALLY REPORTING A STATUS OF A REMOTE SERVER

BACKGROUND OF THE INVENTION

A. Field of the Invention

This invention relates to methods and systems for monitoring and reporting performance characteristics of a remote server within a network and, more particularly, to methods and systems for monitoring and dynamically reporting a status of system activity for a remote server within a distributed computing network.

B. Description of the Related Art

In the past, computers were massive stand-alone machines, incapable of communicating with each other. They were used simply as fast calculating machines in limited applications. However, the computers of today are typically much smaller and orders of magnitude faster than those of yesterday. Moreover, the computers of today are typically networked together so that they may efficiently communicate, share information, and become useful in a larger variety of applications.

In the context of such a networked computing environment, the idea of distributed computing and client/server relationships arose. In general, distributed computing is based on a distributed computing network that processes, stores, and handles diverse operations by different computers or nodes within the network. In one type of distributed computing environment, one of the computers may be considered a client while another computer in the network may be considered a server to that client. For example, a person (commonly referred to as a user) may use one computer merely as an access vehicle to the information and computing resources of the network while another computer operates as a server to provide such information or computing resources to the first computer. In this situation, the first computer is considered a client because it is provided with the information or computing resources by a server, e.g., the second computer.

Servers are often classified by their function. A "file server" is a type of server in the network that is dedicated to managing information within files stored on a memory storage device, such as a hard disk drive. A "compute server" is another type of server capable of running particular software programs for another computer (i.e., a client) instead of running the programs on the other computer directly. In some network installations, a server may perform both file server and compute server functions depending upon the network's performance needs, hardware, and the costs involved.

Thus, it is known that using servers in computer networks is often more efficient and economical by allowing fewer but more powerful (and more expensive) computers to operate as servers and more numerous but less powerful (and less expensive) computers or terminals to operate. as access vehicles or user nodes. In this manner, the computing resources of the network can be better and more efficiently utilized with servers.

However, the use of servers is not without problems. Their use often leads to large numbers of users depending upon the servers being constantly available for file access and software execution. If a server becomes undesirably busy or overloaded or otherwise encounters performance problems, a system administrator responsible for the server's network often quickly becomes the center of attention of users demanding correction of the situation. A busy or overloaded server or otherwise encounters problems can also critically disrupt the operations of a business. This can result in lost business, lost worker productivity, and a great deal of aggravation by the end user. Thus, timely maintenance and rapid diagnostic analysis of servers within a distributed computing network has become increasingly important to both users and system administrators to avoid costly and frustrating server down-time.

To address this problem and successfully maintain and diagnose operations with servers in a networked environment, users typically depend upon a system administrator to analyze historical server data, more specifically referred to as system activity information, on each server in the network. Server data is generally defined as any data related to the performance of the system. For example, system activity information (a type of server data) may include, but is not limited to, information on CPU utilization, disk buffer activity, input/output (I/O) activity, system calls, and memory swapping activities. An analysis of such information on a particular server collected over a period of time may provide an indication of performance for that server. Thus, users typically rely upon the system administrator to perform such an analysis.

While such an analytical process may eventually produce results indicating the status of a server, gathering such data on a network's servers (e.g., server data) is usually undesirably long. In response to end user complaints, a dedicated system administrator must be engaged to analyze the potential problem on one or more servers. This normally includes having the system administrator accessing each of the servers, collecting data files on the network's servers, and assembling these files in a central repository. If the network is very large and geographically spread out, this task can be time consuming, frustrating to the user, and costly to the network owner. Once this vast amount of data is assembled together, the data must then be read and further analyzed in an attempt to give an indication of performance for a server. Accordingly, the time it takes to gather and analyze the appropriate information by the system administrator can be undesirably long leading to increased response time to user's performance requests on servers. This response time can be worse if the system administrator becomes inundated with numerous performance requests at the same time.

In addition to the undesirable response time usually associated with such a process, there are several other problems with such a reactive server maintenance and diagnostic analysis process. First, the process typically requires specialized training to gather the data, initiate any analysis, and interpret the results. System administrators must understand the nuances of many different operating systems, become fluent in networking protocols and have a firm understanding of the interaction with the server's hardware. Furthermore, the process may not allow a user to independently conduct and quickly view the testing results. It usually requires intervention by a designated system administrator or someone specially trained to maintain the network. If the designated person is busy or otherwise unavailable, the user is unfortunately left without an understanding of what is happening on the network and, in particular, what is occurring on the server.

Accordingly, there is a need for a system within a distributed computing environment that efficiently allows monitoring and dynamic reporting of server status to a system administrator. Additionally, there is need for such a system for use by a user without the time associated with training technicians to gather and analyze server data and without the time associated with training users to interpret the data.

SUMMARY OF THE INVENTION

Methods and systems consistent with the present invention overcome the shortcomings of existing status reporting techniques by automatically collecting and downloading server data from each remote server in a network to a managing server so that a status output can be dynamically generated in response to a request.

Methods and systems consistent with the invention, as embodied and broadly described herein, describe a method for monitoring and dynamically reporting a status of a remote server. The method begins by downloading server data from the remote server to a managing server. The server data, such as system activity information associated with the remote server, indicates the status of the remote server and is typically collected on the remote server. The server data may be downloaded by periodically compiling system activity information associated with the remote server into a parameter file and downloading the parameter file as the server data. In more detail, the server data may be downloaded by collecting system activity information which is associated with at least one operational characteristic of the remote server. Periodically, the system activity information may be compiled into a parameter file representing the server data over a predefined time period. After the predefined time period, the parameter file may be downloaded to the managing server.

A database entry is updated based upon the server data and in response to downloading the server data. This is typically accomplished by processing the downloaded server data into appropriate parts of the database.

Once the database entry is updated, a request is received from a user node. The request may have one or more selections related to the remote server. Information is extracted from the database entry in response to receiving the request. The information is based upon the selections in the request. Once the information is extracted, an output, such as a graphical output file, is dynamically created from the information. The output provides the status of the remote server and is transmitted to the user node so that the status of the remote server is reported to the user node.

In more detail, the selections may be determined from the request. The determined selections identify the remote server from a group of network elements in a distributed computing network. The selections further identify a selected type of system activity information. Additionally, when extracting the information, the information is typically extracted because it relates to the remote server and the selected type of system activity information.

Furthermore, the extracted information is typically analyzed to determine the status of the remote server based upon the selected type of system activity information. This may be done to determine the status of the remote server over a selected time interval. Based upon this determined status, the output is dynamically generated, preferably as a graphical output file, representing the status of the remote server and preferably including trends related to the remote server.

In accordance with another aspect of the invention as embodied and broadly described herein, a system is described for monitoring and dynamically reporting a server status within a distributed computing network. The system includes a managing server, a remote server in communication with the managing server through the distributed computing network, and a user node also in communication with the managing server through the distributed computing network. Additionally, the managing server is coupled to a memory storage device having a database associated with the remote server. The remote server is operative to collect system activity information associated with the server status of the remote server. The managing server is operative to download the system activity information from the remote server over the distributed computing network and update the database stored in the memory storage device to reflect the downloaded system activity information. The user node is capable of generating a performance request related to the remote server while the managing server is able to receive the performance request from the user node. The managing server is also able to extract information from the database based upon a set of parameters of the performance request, dynamically create an output file in response to the performance request using the extracted information, and transmit the output file to the user node over the distributed computing network so that the server status of the remote server is reported to the user node.

In more detail, the remote server is typically operative to collect the system activity information at predetermined points during a defined time period, such as every minute during a day. In this situation, the system activity information is associated with at least one operational characteristic of the remote server, such as CPU utilization. The managing server is typically operative to download the system activity information from the remote server after the defined time period, such as the end of the day. Furthermore, the remote server may also be operative to periodically compile the system activity information into a summary file, which may be downloaded from the remote server by the managing server and then processed into the database on the memory storage device.

Upon receiving a performance request, the managing server may also be operative to determine the parameters of the performance request. These parameters, more generally known as selections, are portions of the performance request identifying the remote server from a group of network elements in communication with the managing server over the distributed computing network. These parameters also identify a selected type of system activity information, The managing server may also extract information related to the remote server and the selected type of system activity information from the database, analyze the extracted information to determine the server status of the remote server, and generate a graphical output file as the output representing the server status. Furthermore, the managing server may be operative to generate trend information within the output. The trend information usually indicates performance trends related to the remote server.

BRIEF DESCRIPTION OF THE DRAWINGS

The accompanying drawings, which are incorporated in and constitute a part of this specification, illustrate an implementation of the invention. The drawings and the description serve to explain the advantages and principles of the invention. In the drawing, FIG. 1 a block diagram of an exemplary distributed computing network environment within which the invention may be implemented.

DETAILED DESCRIPTION

Reference will now be made in detail to an exemplary implementation consistent with the invention as illustrated in the accompanying drawings. Wherever possible, the same reference numbers will be used throughout the drawings and the following description to refer to the same or like parts.

Introduction

In general, methods and systems consistent with embodiments of the invention automatically collect and download server data to a managing server so that a user (i.e., any person logged onto the network including a system administer) can easily and independently submit a request to the managing server for the status of a server. By doing so, the managing server can process the server data for that server and quickly provide an output, such as a graph illustrating specific server data Furthermore, by using such an automatic process, the user is advantageously provided with data on the status of any server within the network without needing specialized training and without the need to engage a third party, such as a system administrator other than the user.

In more detail, an exemplary embodiment consistent with the invention provides automated collection and compilation of system activity information on the servers in a network and an interface to a user as a common point of access so that the user can find out a status on any server within a distributed computing network. In the exemplary embodiment, system activity information is collected and then downloaded from each remote server in the network to a managing server. A database is updated to reflect the collected and downloaded system activity information. The database is updated and available so that the managing server can receive and process a performance request from a user (via an electronic request from a user node's browser software) using the database. The request normally includes a series of selections related to the particular remote server of interest to the user. Information from the database is extracted based upon the selections in the request. Based upon the extracted information, an output is dynamically generated specific to the user's desires (e.g., the selections in the request) and transmitted back to the user. In this manner, the managing server efficiently and quickly provides the output, such as a graph or graphical output file illustrating specific system activity information, directly to the user without the need for system administrator intervention.

Distributed Computing Network Environment

Figure 1:
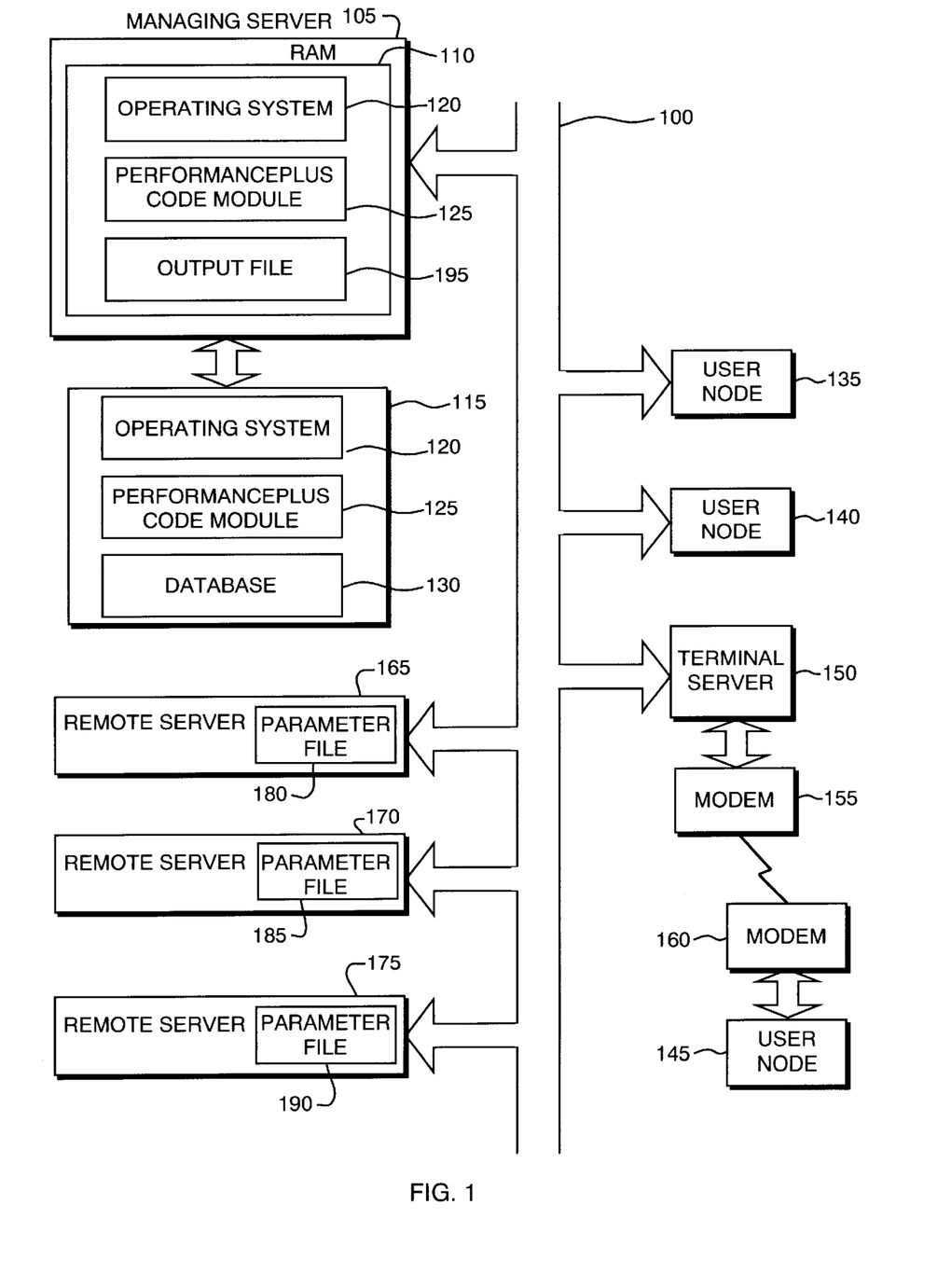

FIG. 1 depicts an exemplary distributing computing network environment suitable for practicing methods and implementing systems consistent with the invention. As shown in FIG. 1, network 100 is generally defined as a data communication network, such as a local area network (LAN) or a wide area network (WAN), that interconnects two or more network elements. In the exemplary embodiment, user nodes 135, 140, and 145, remote servers 165, 170, and 175, and a managing server 105 are all computers (more generally referred to as network elements) interconnected within network 100.

A user node is generally defined as any terminal or computer that allows a user to send or receive information over network 100. In the exemplary embodiment, user nodes 135, 140, and 145 provide a user access to information and resources within network 100. User nodes 135, 140 are typically conventional computer workstations, such as an IBM-compatible personal computer. User nodes 135, 140 are preferably configured with the appropriate conventional networking hardware and software to successfully connect to network 100.

While user nodes 135, 140 connect directly to network 100, user node 145 is connected in an indirect fashion. Those skilled in the art will quickly appreciate that it is also possible for a user node, such as user node 145, to remotely or indirectly connect to network 100 through a terminal server 150. In this remote access situation, user node 145 communicates through modem 160 to modem 155, which is preferably part of terminal server 150. Thus, user node 145 operates as an element of network 100 without being directly and physically connected to network 100.

In order to establish a logical connection to network 100, user nodes 135, 140, and 145 typically execute an access program. The access program can be defined as any software or firmware executed by the user node that allows information and requests to be sent to and received from other network elements, such as managing server 105, within network 100.

In the exemplary embodiment, network 100 is a enterprise-wide intranet with thousands of nodes. However, only a limited number of nodes are depicted in FIG. 1 to avoid confusion. User nodes 135, 140, and 145 preferably run a conventional browser software package, such as MICROSOFT INTERNET EXPLORER browser software distributed by Microsoft Corporation or NETSCAPE NAVIGATOR browser software distributed by Netscape Communications Corporation, to gain access to network 100 and its resources. In this manner, access is gained by executing the browser software package and entering a uniform resource locator (URL) address into an address field of the browser software package. Thus, when a user logs onto network 100 in such a manner, the user can access the network's resources such as managing server 105.

Another type of network resource is a remote server. The remote server is generally defined as any type of server resource, such as a file server, compute server, or any other type of network element in a server relationship with another network element within a distributed computing network. In the exemplary embodiment, remote servers 165, 170, and 175 are relatively powerful multitasking and multiprocessing computers configured to operate under a variant of the conventional UNIX operating system, such as the SOLARIS operating system distributed by SunSoft and Sun Microsystems, Inc., the HP-UX operating system distributed by Hewlett-Packard, or the AIX operating system distributed by International Business Machines, Inc.

Although not shown in FIG. 1, each remote server 165, 170, and 175 also includes a memory storage device, such as a hard disk drive, to maintain its operating system, system performance data files (such as parameter files 180, 185, and 190), and application programs used by other end users of the network 100. In this manner, remote servers collect system performance data files in addition to running application programs for their end users. That data files are moved to a data repository (more generally called database 130) on managing server 105. In this manner, the managing server 105 manages data files in a file server capacity and runs software that generates an interface to the browser software on the user nodes 135, 140, and 145.

Managing server 105 operates to help maintain and manage system performance data collected from the remote servers within network 100. A managing server is generally defined as a networked computing device in communication with each remote server and each user node within the network. In the exemplary embodiment, managing server 105 is in communication with each remote server 165, 170, and 175 and each user node 135, 140, and 145 within network 100 and stores and displays remote server system performance data.

In the exemplary embodiment, managing server 105 is a multitasking computer (preferably an IBM Model RS6000 Computer Workstation) that is coupled to a memory storage device, such as hard disk 115. Hard disk 115 maintains the server's operating system 120, data files (such as database 130), and program modules or applications (such as Performance Plus Code Module 125 created and distributed by GTE Corp.). When managing server 105 powers up, it loads operating system 120 (preferably the AIX operating system from IBM) into system memory 110 (RAM) from hard disk 115. Once powered up, managing server 105 is operative to execute the Performance Plus Code Module 125 in RAM 110 in order to provide information to users (via user nodes 135, 140, and 145) about the status of a remote server in the network. While managing server 105 is illustrated in FIG. 1 as a dedicated network element, those skilled in the art will quickly appreciate that any server in a network can operate as a managing server to provide information about the status of other network elements in the network.

Those skilled in the art can appreciate that network 100 may also include other network elements (not shown in FIG. 1), such as terminals, bridges, routers, repeaters, and conventional gateway. Thus, network elements within network 100 are considered to be in communication with each other as long as information and requests can be sent from one element to another regardless of the physical implementation of the network or the diversity of network elements between two elements.

Figure 2:
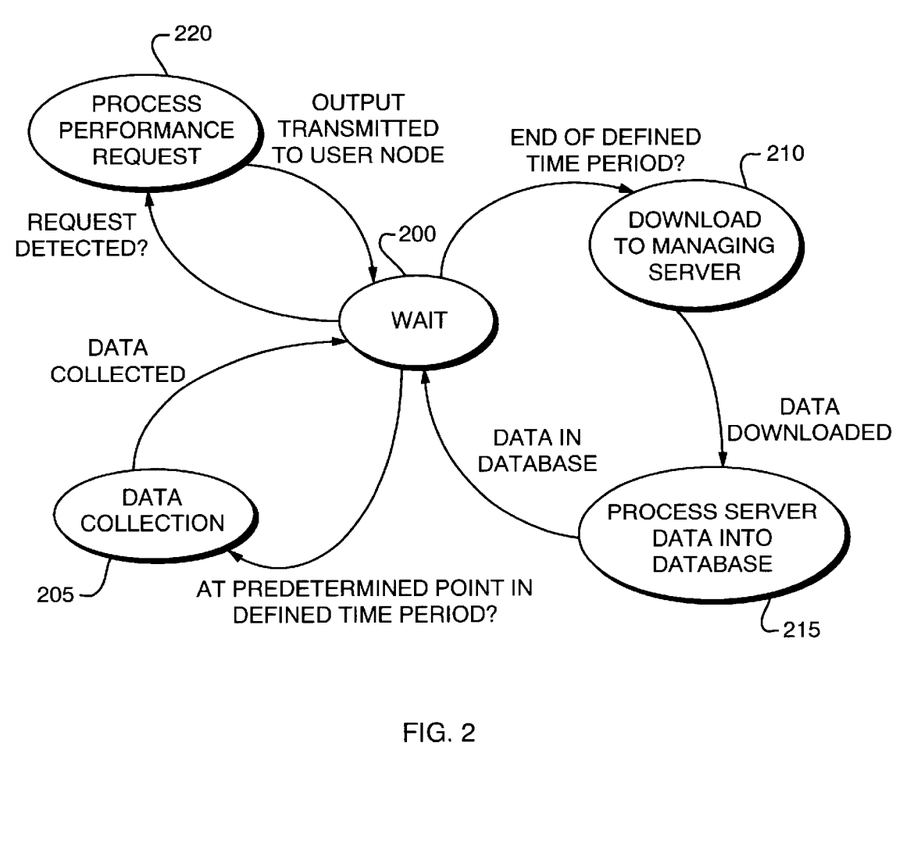
FIG. 2 is a state diagram illustrating exemplary steps for monitoring and reporting the status of a remote server consistent with an exemplary embodiment of the invention.

In the context of the networked computers illustrated in FIG. 1, FIG. 2 is a state diagram illustrating how events related to the networked computers occur when monitoring and reporting the status of a remote server consistent with an embodiment of the invention. At state 200, a wait state exists. In the wait state, the remote servers, user nodes, and managing server may be performing tasks unrelated to reporting a status of a remote server. State 200 is typically left only at specific times (data collection and data downloading) and upon receipt of a request to provide remote server status for purposes of this embodiment of the invention.

When a predetermined point in a defined time period occurs, system activity information is collected at each remote server in state 205. In general, data related to the operation of a remote server (i.e., system activity information) is gathered or collected on each of the remote servers in state 205. In the exemplary embodiment, system activity information on each remote server 165, 170, and 175 are collected by executing a specific UNIX system command, such as "sar", on each of the remote servers at specific time intervals throughout a day. Preferably, system activity information is collected at least every twenty minutes during a day. In this manner, system activity information is gathered in an automatic fashion and then stored in a local file, such as parameter files 180, 185, and 190. The file, more generally called a summary file, is preferably an ASCII text file containing a history of system activity information related to the operation of a remote server. Once the data is collected, operation returns to the wait state 200.

At the end of the defined time period (e.g., the end of a day), system activity information is downloaded to managing server 105 in state 210. In the exemplary embodiment, the file of system activity information is automatically downloaded by managing server 105 from each of the remote servers 165, 170, and 175 over network 100. Once downloading is complete, operation flows to state 215 where the downloaded data is processed into database 130. In this manner, system activity information related to each remote server is kept available on managing server 105. Once database 130 is updated with the system activity information, operation returns to the wait state 200. The data collection and data downloading operations are discussed in more detail below with regard to FIG. 4.

While in wait state 200, a user may connect to managing server 105 using browser software running on a user node, such as user node 135. Once connected, the user can send a request from the user node 135 to the managing server 105 for a status on a particular remote server. When this request is detected, operation shifts to state 220 where the request is processed by managing server 105 to provide an output representing the status of the selected remote server. In the exemplary embodiment, managing server 105 processes the request by executing parts of Performance Plus Code Module 125 to extract particular data from database 130 and dynamically generate the output using this extracted data. Once the output is transmitted back to the requesting user node, operation again returns to the wait state 200. The request processing operations on managing server 105 are discussed in more detail below with regard to FIG. 5.

A better understanding of how a request is created and provided to managing server 105 can be illustrated from a user's perspective with FIGS. 3A–3G. When a user creates a request for remote server status, the user typically is logged onto network 100 using one of the user nodes 135, 140, and 145. In the exemplary embodiment, the user node is preferably executing browser software enabling the user to access to different nodes on network 100. The user node preferably establishes a link to managing server 105 using a conventional URL address for the managing server 105. In an alternative embodiment of the invention, the user node may not have a preexisting link established with managing server 105 prior to submitting a request. Thus, the user node may simply transmit a request to the managing server 105 without any prior logical connection to the user node.

At this point, the user desires information on the status of one of the remote servers 165, 170, and 175 without having to contact a system administrator and without having to wait for a long period of time. Essentially, FIGS. 3A–3G are illustrations of an interface used when the user makes performance request selections consistent with an exemplary embodiment of the invention. Typically, managing server 105 generates the interface while the user node merely displays it through conventional browser software running on the user node.

Figure 3A:
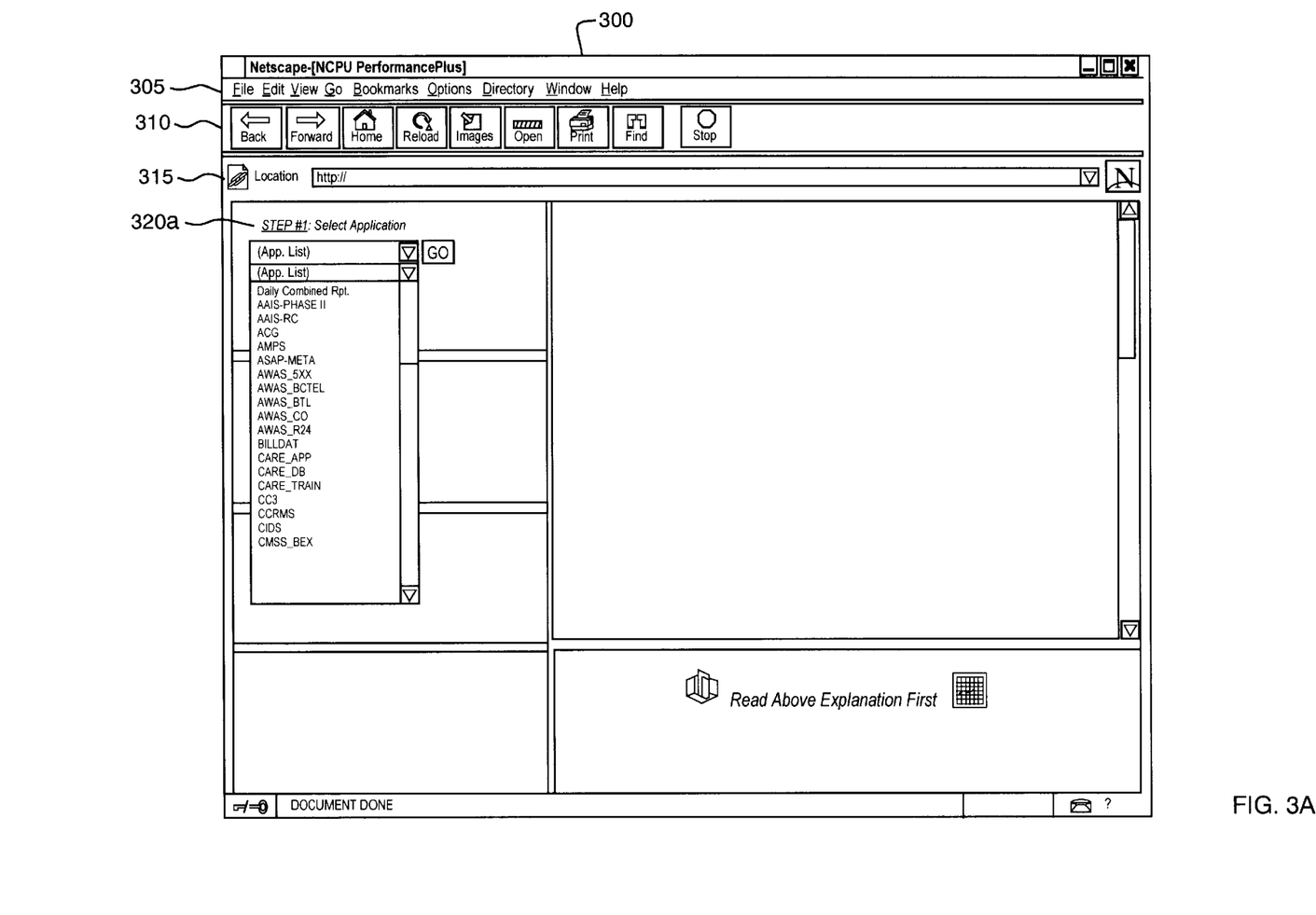
FIGS. 3A–3G, collectively referred to as FIG. 3, are exemplary illustrations of an interface used for making performance request selections by a user when monitoring and reporting the status of a remote server consistent with an exemplary embodiment of the invention.
Figure 3B:
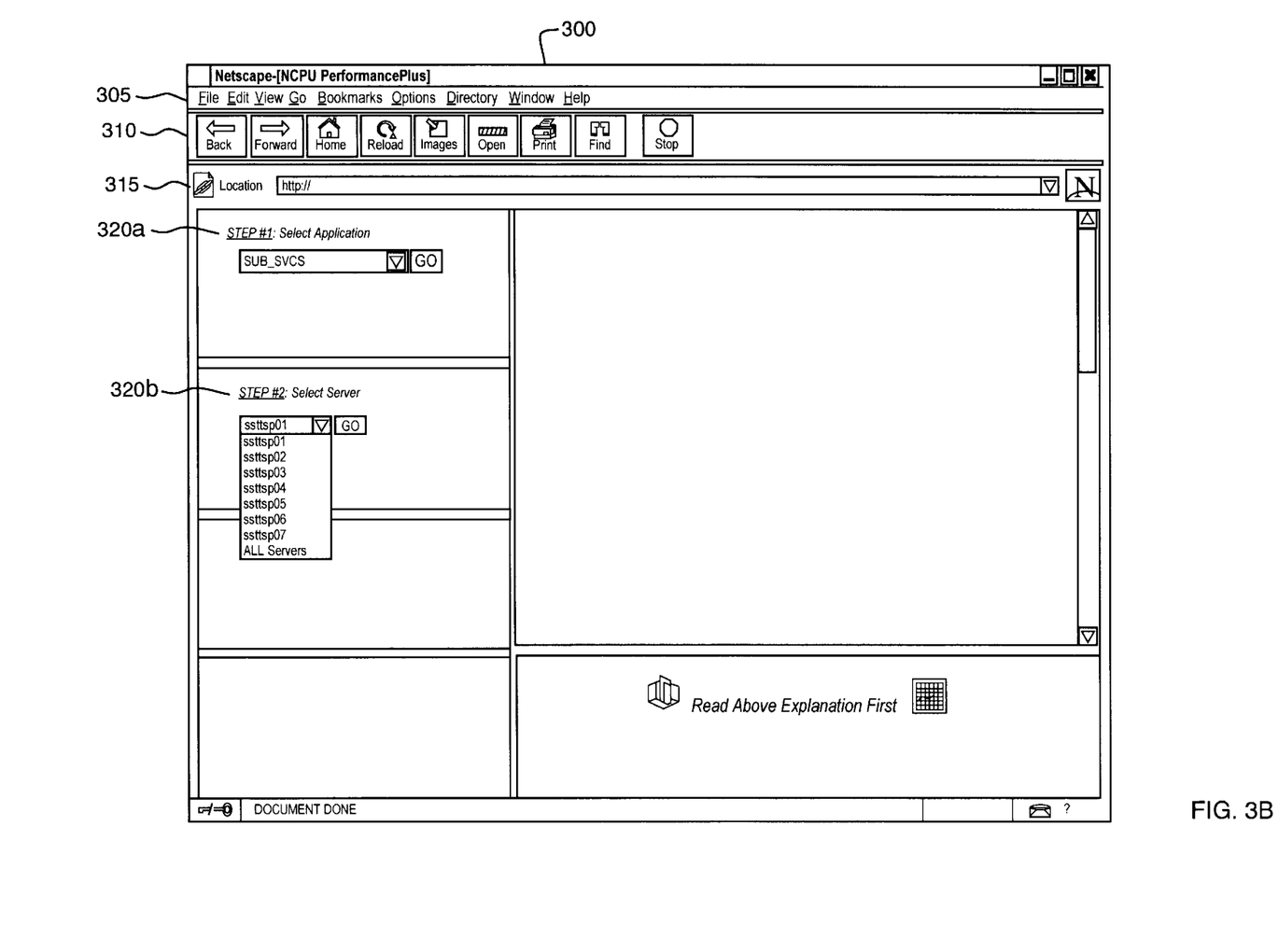
Figure 3C:
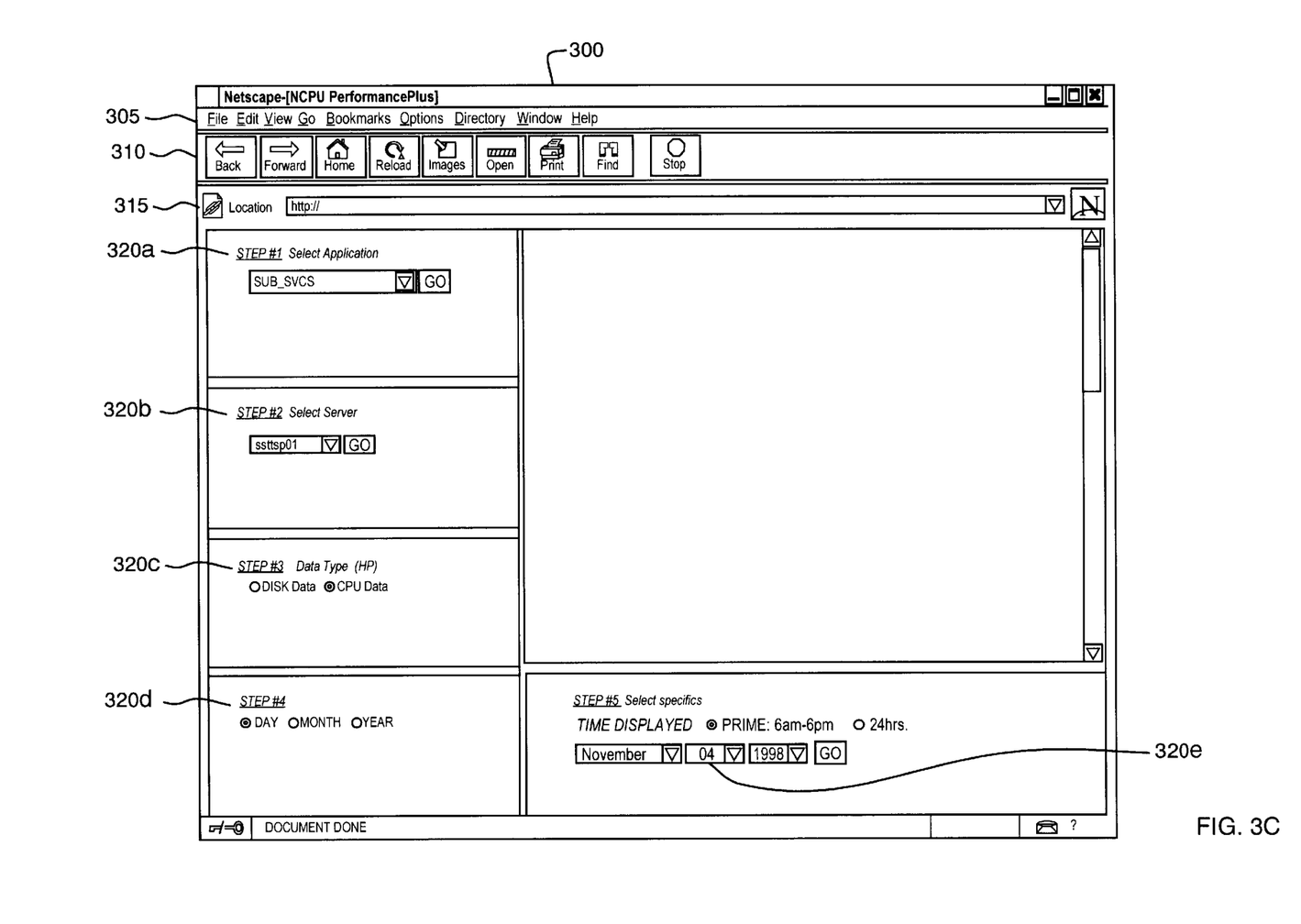
Figure 3D:
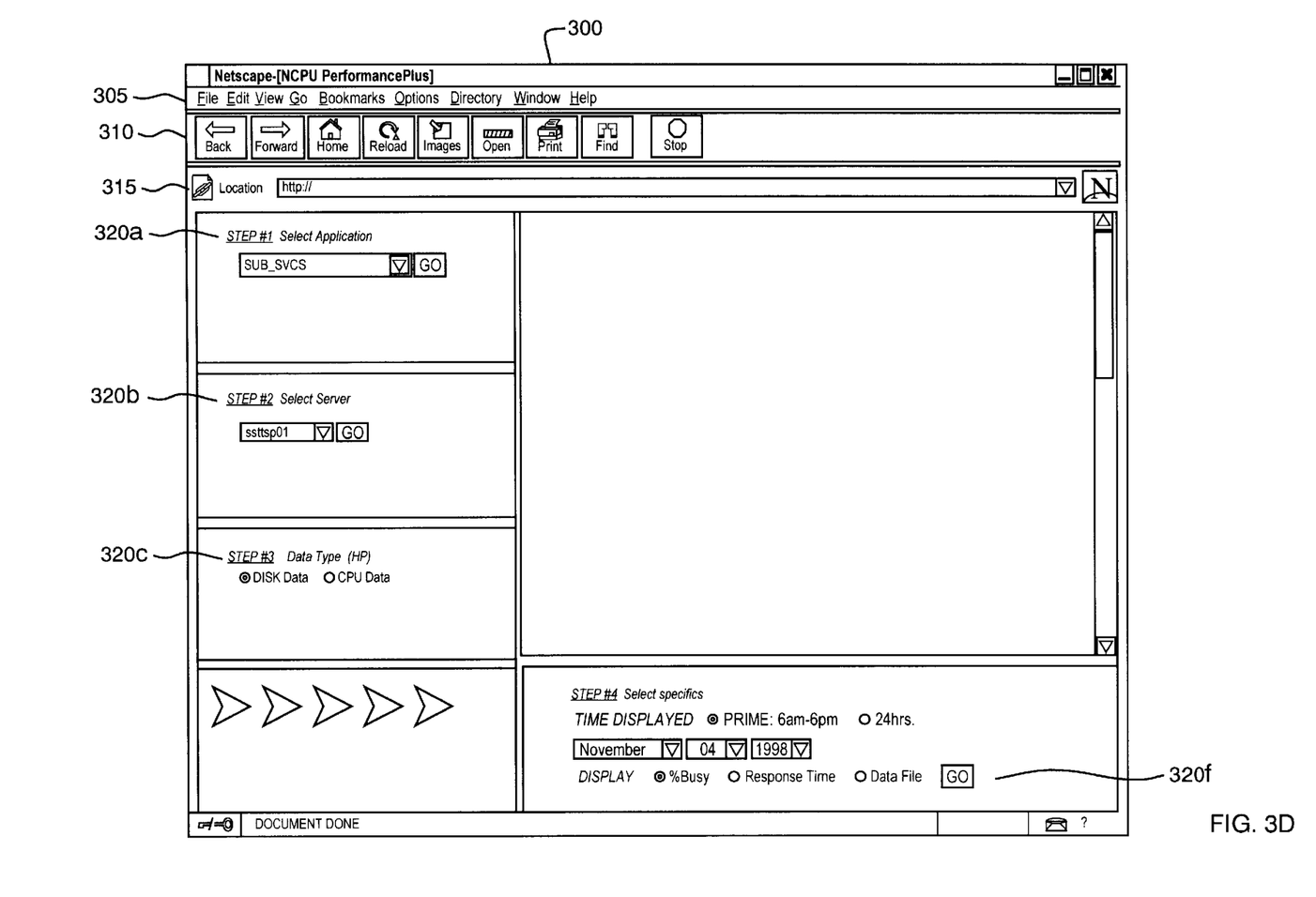
Figure 3E:
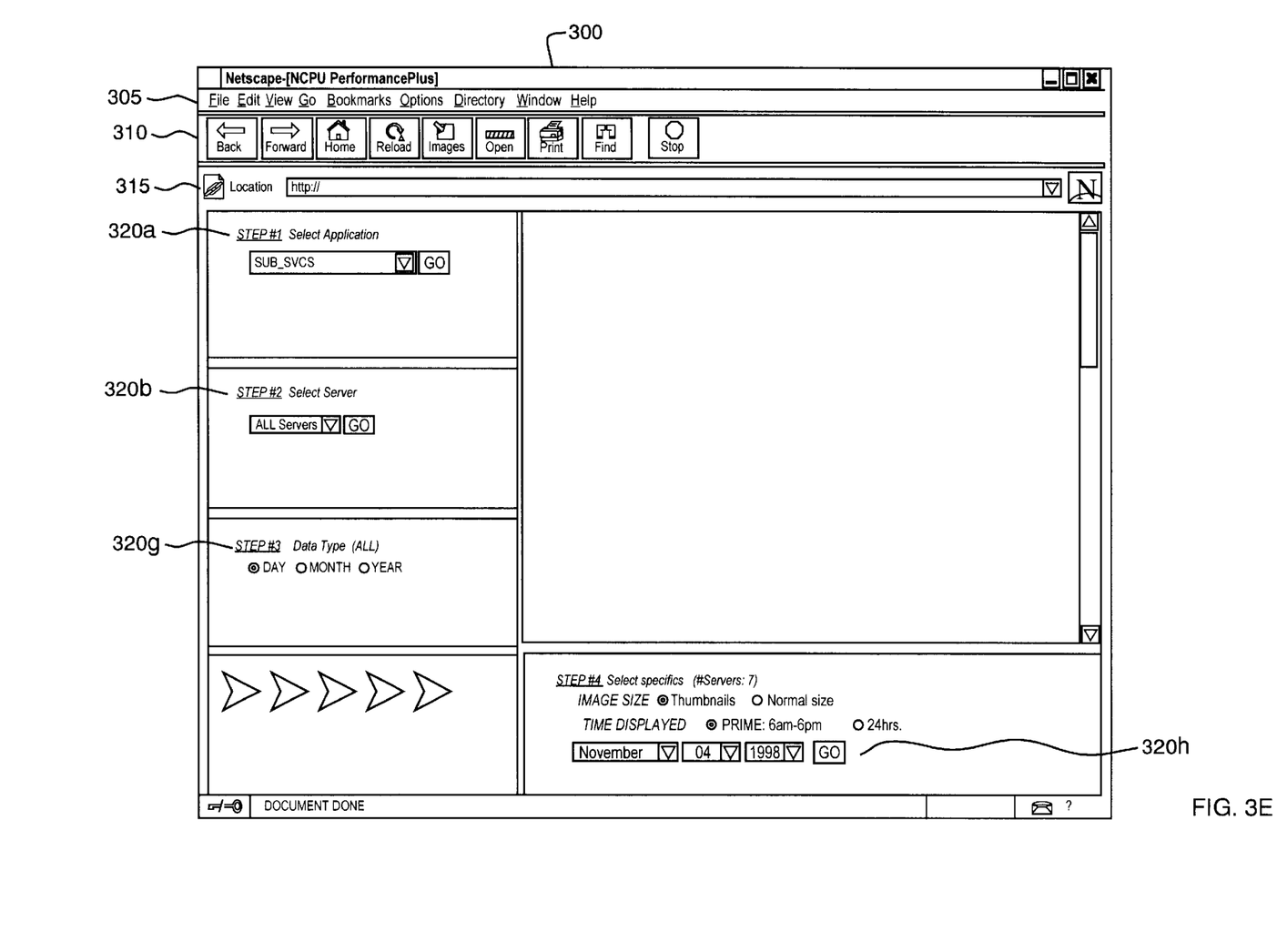

Referring now to FIG. 3A, a window 300 is illustrated within which are menu items 305, a button bar 310, an address field 315, and one or more selection fields. In FIG. 3A, the user is prompted to select an application of interest within an application selection field 320a. The user may not be aware which remote server is operating slowly when the user runs a particular application over network 100. Providing application selection field 320a allows the user to pre-determiine which of the remote servers may be the cause of the problem without having to resort to system administrator intervention. Thus, in FIG. 3B, the user is prompted to select which of the remote servers running the selected application (see field 320a) is of interest within a server selection field 320b. In FIGS. 3C–3E, the user makes one or more selections indicating the type of system activity information desired on the selected remote server. As previously mentioned, system activity information is defined as any data related to the performance of the system. An example of server data is system activity information, such as CPU utilization, disk buffer activity, input/output (I/O) activity, system calls, and/or memory swapping activities related to the server. In FIG. 3C, the user selects a CPU data type in field 320c. As a result, additional selection fields 320d and 320e appear in window 300 in order to more completely define the CPU data type of system activity information desired. The additional selection fields 320d and 320e allow selection of a time interval under consideration.

In FIG. 3D, the user selects a disk data type in field 320c instead of the CPU data type. As a result, another selection field 320f appears in window 300 in order to more completely define the disk data type of system activity information desired. The additional selection field 320f allows selection of a time interval under consideration and a format to display the output.

For some remote servers, a comprehensive data type is available incorporating data on both CPU performance and disk performance. In FIG. 3E, a selection field 320g for a comprehensive data type is illustrated where the user is prompted to select a time interval under consideration. Furthermore, an additional field 320h allows additional selections related to format of the output.

Once selections related to the remote server to be scrutinized are made by the user, the user node transmits a message to managing server 105 over network 100 incorporating the selections as a performance request. In the exemplary embodiment, the performance request is represented as one or more messages from one of the user nodes 135, 140, and 145 to managing server 105. Managing server 105 receives the request, processes it based on the selections in the request and dynamically creates an output in response. This output is transmitted by managing server 105 to the requesting user node (one of user nodes 135, 140, and 145) where the output is displayed to the user.

Figure 3F:
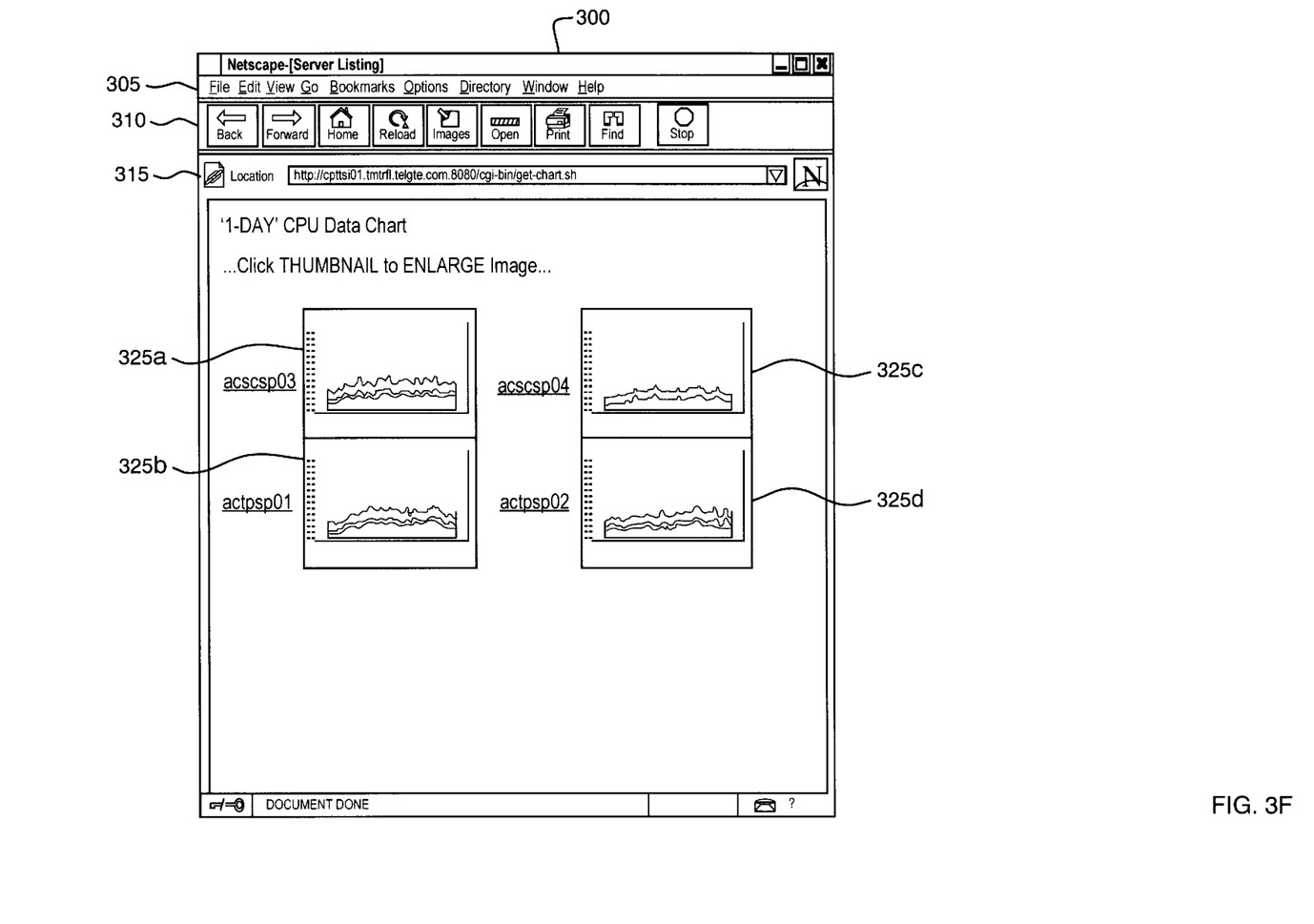
Figure 3G:
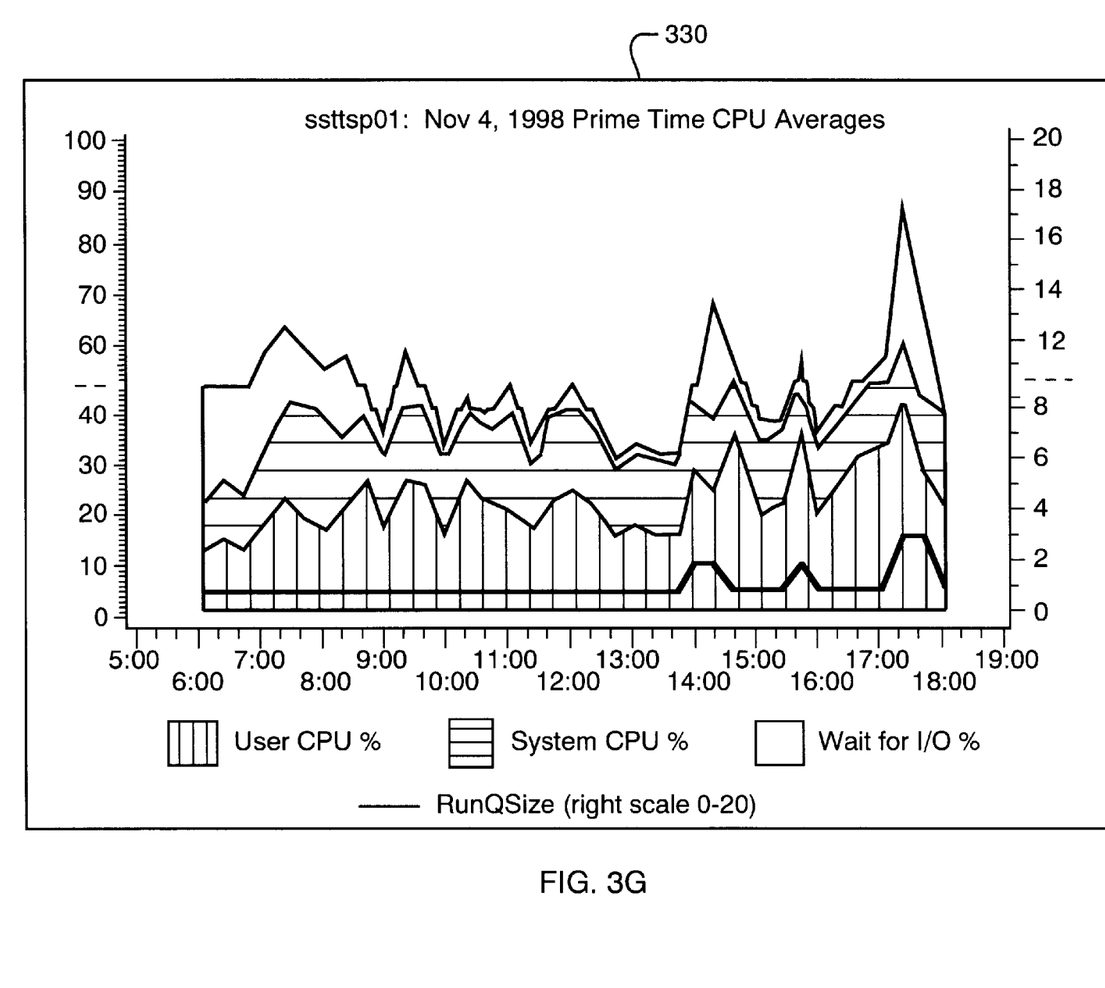

In FIG. 3F, the contents of an exemplary output is illustrated in window 300 from the user's perspective. The output essentially can be any feedback from the managing server's provision of information on the status of the remote server being scrutinized. The format of the output can be in a variety of formats, such as textual or graphical. In the example illustrated in FIG. 3F, the output is a graphical output file, such as a hypertext markup language (HTML) page incorporating several thumbnail images 325a–d representing the status of a remote server. These thumbnail images 325a–d provide historical specific system activity information, such as CPU utilization, disk usage, or memory swapping.

If more detail is desired, the user can display a more detailed image of one of the thumbnail images 325a–d in window 300 on the user node. For example, in FIG. 3G, a detailed graph 330 is illustrated providing CPU and I/O information related to a remote server called "ssttspol." The user is able to comprehend performance issues related to the server and provide this information to others (such as a system administrator) if further analysis or measures are needed.

Thus, a user is provided with a useful diagnostic tool and the system administrator is able to minimize time consuming status inquiries related to remote servers on the network. In other words, it is easy for a user to log on to the network, request the status of a particular server, and interpret the results without waiting for long periods of time, with little to no training, and without the intervention of a dedicated system administrator.

Figure 4:
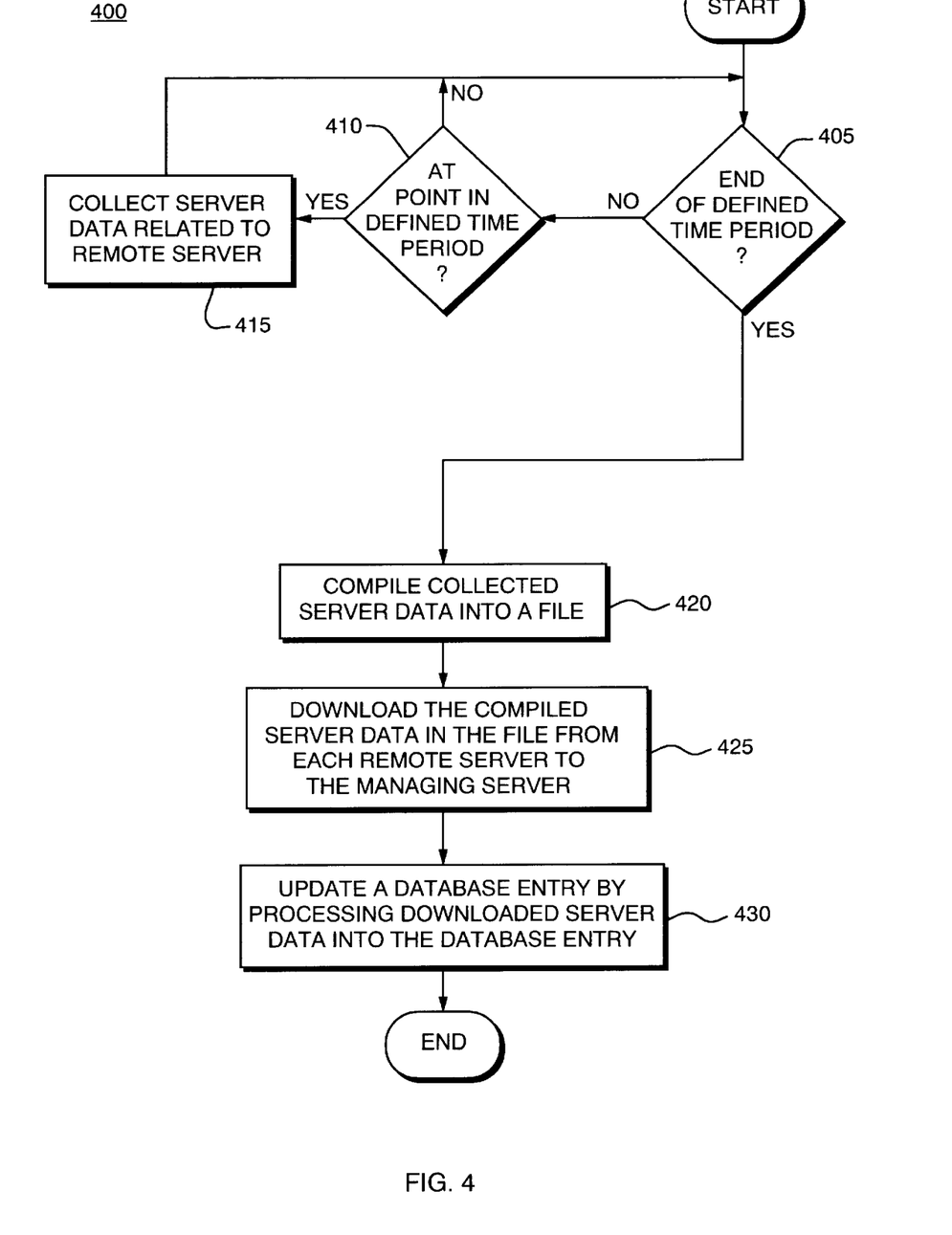
FIG. 4 is a flow chart illustrating typical steps for collecting and downloading system activity information consistent with an exemplary embodiment of the invention.
Figure 5:
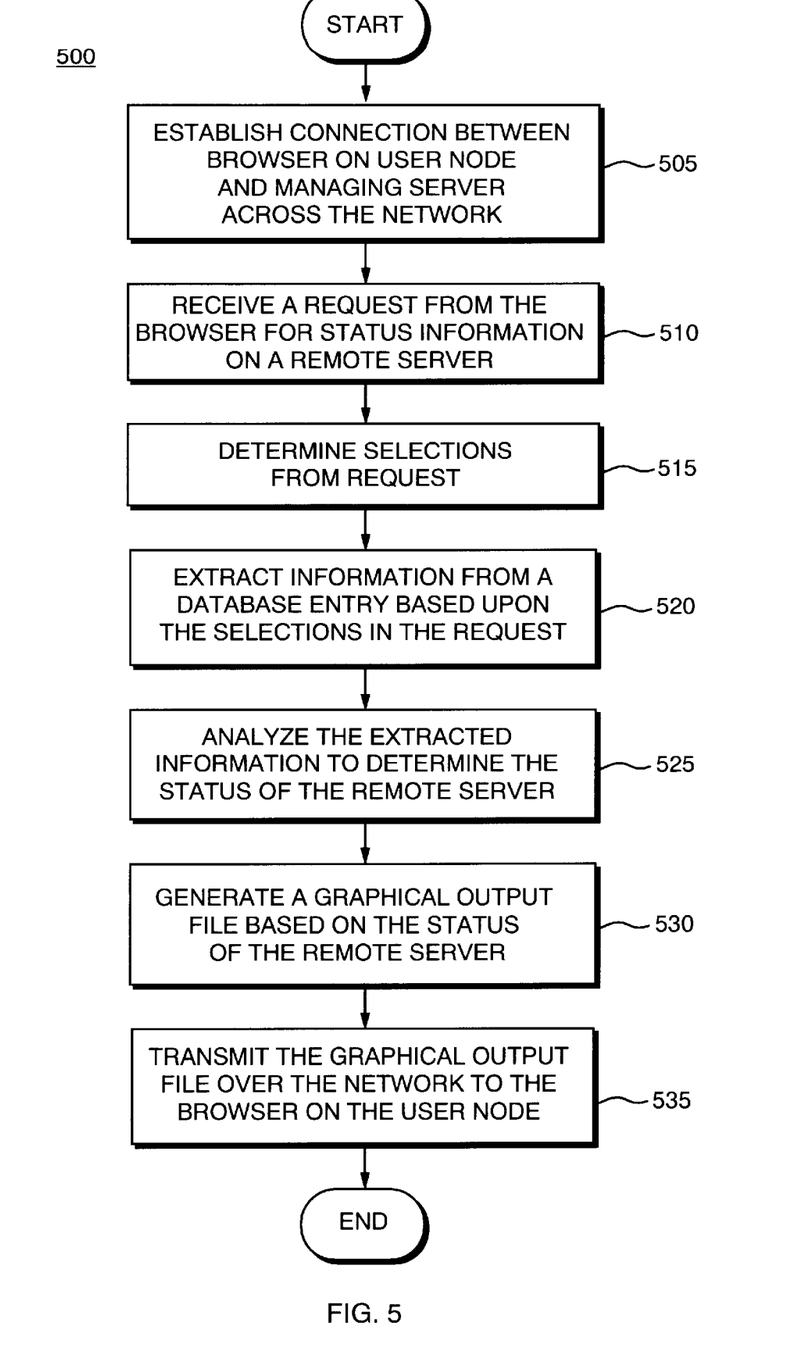
FIG. 5 is a flow chart illustrating typical steps for dynamically processing a performance request in order to report the status of a remote server consistent with an exemplary embodiment of the invention.

A more detailed description of an embodiment of the invention is described in conjunction with FIGS. 4 and 5, which illustrate exemplary steps for monitoring and reporting the status of a remote server consistent with the embodiment of the invention. As mentioned before, FIG. 4 is a flow chart illustrating typical steps in a method for collecting and downloading system activity information consistent with an exemplary embodiment of the invention. The method 400 begins with steps 405 and 410, which essentially determine when to collect and download system activity information. In particular, a determination is made at step 405 whether the end of a defined time period (preferably the end of a business day) has occurred. If so, then step 405 proceeds directly to step 420. However, if not, then step 405 proceeds to step 410.

At step 410, a determination is made whether a predetermined point during the defined time period has occurred so that data collection can take place at step 415. In the exemplary embodiment, step 410 determines if a point (such as a particular time of day) within a business day has occurred. If not, then step 410 proceeds back to step 405. However, if so, then data collection on the remote servers is to be done and step 410 proceeds to step 415.

At step 415, system activity information related to each remote server is collected. In the exemplary embodiment, the standard UNIX data collection command "sar" is periodically executed by a remote server at predetermined points during a day to collect information about the remote server. Those skilled in the art will realize that the "sar" command calls a standard UNIX process named "sadc" to access system data. In this manner, the conventional "sar" command outputs the contents of selected cumulative activity counters in the operating system that monitor system activity, such as CPU utilization. It is preferred to use an "sa2" command (a variant shell procedure of the "sar" command) to automatically collect such data in conjunction with the standard UNIX "cron" command. The "cron" command is a command that schedules jobs or processes to be executed at a time in the future and can be used as a daemon process running in the background on each remote server waiting to collect system activity information at the appropriate time. Those skilled in the art will be familiar with standard UNIX commands, such as "sar", "sa2", and "cron."

While the exemplary embodiment described above uses the "sar" command to collect system activity information, those skilled in the art will appreciate that there are many other ways to gather system activity information. The UNIX operating system (or a variant thereof such as HP-UX or AIX) has several alternative commands for gathering performance-related information on a computer system. For example, the command "prof" gathers execution profile data, the command "sadp" gathers disk access profile data, and the command "sag" outputs a system activity graph. It is further contemplated that system activity information may be collected using a dedicated test system capable of testing performance characteristics of a server and providing the test results or raw test data as system activity information.

At the end of the defined time period (e.g., the end of the day), system activity information has been collected and is in an accessible form on each of the remote servers. At step 420, the collected system activity information is compiled into a file. This is typically done by each remote server on the network. In the exemplary embodiment, the file is a summary or parameter file having a day's worth of system activity information formatted as an ASCII text file. Typically, the data in the file is indexed or categorized by time within that day, device (CPU, drive, etc.), and performance parameter.

At step 425, the compiled system activity information in the file is downloaded from each remote server to managing server 105. In the exemplary embodiment, each file from each remote server is automatically downloaded nightly using the standard UNIX "rcp" command and the "cron" command utility to schedule the process to be executed at night.

At step 430, the downloaded data in each file is processed by managing server 105 to update database 130. In general, a database entry related to a particular remote server is updated based upon the system activity information in that remote server's downloaded parameter file. In the exemplary embodiment, database 130 is an SAS formatted database for UNIX available from SAS Institute, Inc. A UNIX shell script and a SAS program are run on managing server 105 from the UNIX "cron" utility in order to process the downloaded system activity information in parameter files 180, 185, and 190. Once this is accomplished, managing server 105 is ready to dynamically service a performance request related to any of the remote servers.

FIG. 5 is a flow chart illustrating typical steps of a method for dynamically processing a performance request in order to report the status of a remote server consistent with an exemplary embodiment of the invention. The exemplary steps of method 500 begin at step 505 where a connection between the user node and the managing server is established. In the exemplary embodiment, the connection is established between browser software running on one of the user nodes 135, 140, and 145 and sections of the Performance Plus Code Module 125. In this implementation, data flows between the two hosts (user node and managing server) using multiple layers of software that implement standard TCP/IP. Additionally, Performance Plus Code Module 125 includes code modules (such as HTML code, Javascript, and CGI scripts), which enable managing server 105 to connect to the particular user node as a server (e.g., host a website to which the user node can connect). Those skilled in the art will be familiar with HTML code, Javascript, and CGI scripts commonly used to support websites on the global Internet or on intranet applications.

Once the connection is established at step 505, the managing server detects and receives a request from the user node's browser software at step 510. While the request is preferably manually initiated, it is contemplated that the request may also be automatically initiated. The request is for status information on one of the remote servers on the network. In the exemplary embodiment, the request is implemented as one or more Internet protocol (IP) packets created and sent from one of the user nodes to the IP address of managing server 105 over network 100. The Performance Plus Code Module 125 receives the contents of the request after the IP packets making up the request are reconstituted into the request by the managing server's operating system 120.

At step 515, the user selections (see FIGS. 3A–3F) are determined from the received request. For example, in the exemplary embodiment, parameters within the request represent the selections and indicate which of the remote servers 165, 170, and 175 is desired, and what type of system activity information is desired.

At step 520, information is extracted from one or more database entries based upon the selections in the request. In general, a database entry is defined as any part of a database, such as database 130. In the exemplary embodiment, a script compatible with the SAS formatted database 130 extracts the information from the database. Depending upon the user's selections and the exact details of how the information is stored in the database 130, the script accesses information stored within fields of one or more database entries. For example, if the user requested the output to be for a specific date, the script accesses information stored in database entries for the remote server of interest and on that particular date.

At step 525, the extracted information is analyzed to determine the status of the remote server. In the exemplary embodiment, the extracted information is read into memory 110 of managing server 105 for analysis prior to creating an output file 195 representing the status of the remote server.

At step 530, an output file is dynamically generated based upon the extracted information representing the status of the remote server. By dynamically generating the output file (instead of merely accessing and outputting the raw system activity information), the managing server creates summarized output only in response to a user's request. This avoids needless processing of downloaded system activity information when the system activity information is not of interest to any user.

It is preferred that the output file contains summarized or generalized information related to the remote server's status. This summarized or generalized information is based upon the extracted information (raw system activity information) from the database. Generating an output file of summarized information instead of the raw system activity information advantageously provides the user with more understandable information related to the status of the remote server. Raw system activity information may be read by a user who has been sufficiently trained or a system administrator. However, providing summarized or generalize information tends to remove the need for specialized training or knowledge about server/network details.

In the exemplary embodiment, output file 195 is typically a file containing summarized data representing the status of the remote server and performance trends related to the remote server. The output file preferably is a graphical output file, such as an HTML file having graphic images embedded within it.

At step 535, the output file is transmitted over the network to the requesting user node. In the exemplary embodiment, a graphical output file is transmitted by a CGI script as one or more IP packets from managing server 105 to one of the user nodes 135, 140, and 145. The browser software running on the user node receives the IP packets and reconstitutes the graphical output file for display on the user node to the user. In this manner, the status of the remote server (represented by the output file) is quickly and easily sent to the user without intervention by a system administrator.

CONCLUSION

Methods and systems consistent with the invention periodically collect system activity information associated with a remote server, such as remote server 165, and store the information into a parameter file, such as parameter file 180. The parameter file is downloaded from the remote server to a managing server where information in the parameter file is used to update a database, such as database 130, on the managing server. In this manner, system activity information on each remote server is collected and available from a central resource.

When the managing server receives a performance request from a user node, information related to selections in the request are extracted from the database. This information is used and analyzed to dynamically create an output, which provides the status of the remote server. Typically, the output (such as a graphical output file) is then transmitted to the user node.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but the invention may be implemented as a combination of hardware and software or in hardware alone. Thus, the scope of the invention is defined by the claims and their equivalents.

What is claimed is:

1. A method of monitoring and dynamically reporting a status of a remote server; comprising:

downloading system activity information from the remote server to a managing server, the system activity information indicating the status and performance of the related remote server;

updating a database entry based upon the system activity information in response to downloading the system activity information;

receiving a request from a user node, the request having one or more selections related to the remote server;

extracting information from the database entry in response to receiving the request, the information being based upon the selections in the request;

dynamically creating an output from the information in response to receiving the request, the output providing the status of the remote server; and transmitting the output to the user node so that the status and performance of the remote server is reported to the user node.

2. The method of claim 1 further comprising collecting the system activity information on the remote server downloading to the managing server.

3. The method of claim 2, wherein the collecting step further comprises collecting system activity information associated with the remote server as the system activity information.

4. The method of claim 1, wherein the downloading step further comprises periodically compiling system activity formation associated with the remote server into a parameter file and downloading the parameter file as the system activity information.

5. The method of claim 1, wherein the downloading step further comprises:

collecting system activity information on the remote server, the system activity information being associated with at least one operational characteristic of the remote server;

periodically compiling the system activity information into a parameter file representing the system activity information over a predefined time period; and after the predefined time period, downloading the parameter file to the managing server.

6. The method of claim 4, wherein the updating step further comprises processing the system activity information into the database entry.

7. The method of claim 6 further comprising determining the selections from the request, the selections identifying the remote server from a plurality of remote servers in a distributed computing network, the selections further identifying a selected type of system activity information; and wherein the extracting step further comprises extracting the information from the database entry, the information being related to the remote server and the selected type of system activity information.

8. The method of claim 7, wherein the dynamically creating step further comprises:

analyzing the extracted information to determine the status of the remote server based upon the selected type of system activity information; and generating the output based upon the determined status of the remote server.

9. The method of claim 8, wherein the generating step further comprises generating a graphical output file representing the status of the remote server.

10. The method of claim 8, wherein the analyzing step further comprises analyzing the extracted information over a selected time interval to determine the status of the remote server.

11. The method of claim 10, wherein the status of the remote server includes trends related to the remote server.

12. A method for monitoring and dynamically reporting a status of a remote server within a distributed computing network, comprising:

periodically collecting system activity information associated with the remote server and storing the system activity information into a parameter file;

downloading the parameter file from the remote server to a managing server, the system activity information in the parameter file indicating the status and performance of the related remote server;

updating at least one database entry with the system activity information;

receiving a performance request from a user node, the request having a plurality of selections related to the remote server;

extracting information from the at least one database entry in response to receiving the performance request, the information being based upon the selections in the performance request; and dynamically creating an output from the information in response to receiving the request, the output providing the status and performance of the remote server.

13. The method of claim 12 further comprising transmitting the output to the user node so that the status of the remote server is reported to the user node.

14. The method of claim 12, wherein the collecting step further comprises collecting system activity information associated with at least one operational characteristic of the remote server at predetermined points during a defined time period and periodically compiling the system activity information into the parameter file during the defined time period; and wherein the downloading step further comprises downloading the parameter file from the remote server to the managing server at an end of the defined time period.

15. The method of claim 14, wherein the updating step further comprises processing the system activity information within the parameter file to update the at least one field within the database entry.

16. The method of claim 15 further comprising determining the selections from the performance request, the selections identifying the remote server from a plurality of network elements in a distributed computing network, the selections further identifying a selected type of system activity information; and wherein the extracting step further comprises extracting the information from the at least one field within the database entry, the information being related to the remote server and the selected type of system activity information.

17. The method of claim 16, wherein the dynamically creating step further comprises:

analyzing the extracted information to determine the status of the remote server; and generating the output representing the status of the remote server over a selected time interval based upon the determined status of the remote server.

18. The method of claim 17, wherein the generating step further comprises generating a file as the output, the file having data representing performance trends related to the remote server.

19. A system for monitoring and dynamically reporting a server status within a distributed computing network, comprising:

a managing server in the distributed computing network;

a remote server in communication with the managing server through the distributed computing network;

a user node in communication with the managing server through the distributed computing network, the user node being capable of generating a performance request related to the remote server;

a memory storage device coupled to the managing server and having a database associated with the remote server;

the remote server being operative to collect system activity information associated with the server status and performance of the related remote server; and the managing server being operative to download system activity information from the remote server over the distributed computing network, update the database stored in the memory storage device to reflect the downloaded system activity information, receive the performance request from the user noted, extract information from the database based upon a plurality of parameters of the performance request, dynamically create an output file in response to the performance request using the extracted information, and transmit the output file to the user node over the distributed computing network so that the server status and performance of the remote server is reported to the user node.

20. The system of claim 19, wherein the remote server is further operative to collect the system activity information at predetermined times during a defined time period, the system activity information being associated with at least one operational characteristic of the remote server.

21. The system of claim 20, wherein the managing server is further operative to download the system activity information from the remote server after the defined time period.

22. The system of claim 21, wherein the remote server is further operative to periodically compile the system activity information into a summary file and wherein the managing server is further operative to download the summary file from the remote server.

23. The system of claim 22, wherein the managing server is further operative to process the system activity information within the downloaded summary file into the database.

24. The system of claim 19 wherein the managing server is further operative to:

determine the parameters of the performance request, the parameters identifying the remote server from a plurality of network elements in communication with the managing server over the distributed computing network, the parameters further identifying a selected type of the system activity information; and extract the information from the database, the information being related to the remote server and the selected type of the system activity information as identified using the parameters.

25. The system of claim 24, wherein the managing server is further operative to analyze the extracted information to determine the server status of the remote server and generate a graphical output file as the output representing the server status.

26. The system of claim 25, wherein the managing server is further operative to generate trend information within the output, the trend information indicating performance trends related to the remote server.

* * * * *